US012645760B2

(12) United States Patent
Jesus et al.

(10) Patent No.: US 12,645,760 B2
(45) Date of Patent: Jun. 2, 2026

(54) HUMAN-IN-THE-LOOP EVALUATION FOR EXPLAINABLE ARTIFICIAL INTELLIGENCE

(71) Applicant: Feedzai—Consultadoria e Inovação Tecnológica, S.A., Coimbra (PT)

(72) Inventors: Sérgio Gabriel Pontes Jesus, Gondomar (PT); Catarina Garcia Belém, Seixal (PT); Vladimir Balayan, Lisbon (PT); David Nuno Polido, Lisbon (PT); João Pedro Bento Sousa, Leiria (PT); Joel Carvalhais, Leiria (PT); Ana Margarida Caetano Ruela, Lisbon (PT); Mariana S.C. Almeida, Lisbon (PT); Pedro dos Santos Saleiro, Lisbon (PT); Pedro Gustavo Santos Rodrigues Bizarro, Lisbon (PT)

(73) Assignee: Feedzai—Consultadoria e Inovação Tecnológica, S.A. (PT)

( * ) Notice: Subject to any disclaimer, the term of this patent is extended or adjusted under 35 U.S.C. 154(b) by 1076 days.

(21) Appl. No.: 17/382,075

(22) Filed: Jul. 21, 2021

(65) Prior Publication Data

US 2022/0027679 A1    Jan. 27, 2022

Related U.S. Application Data

(60) Provisional application No. 63/056,152, filed on Jul. 24, 2020.

(30) Foreign Application Priority Data

Jul. 19, 2021    (PT) .......................................... 117353
Jul. 20, 2021    (EP) ...................................... 21186755

(51) Int. Cl.
*G06F 18/21*          (2023.01)
*G06N 5/045*         (2023.01)

(52) U.S. Cl.
CPC ......... *G06F 18/2178* (2023.01); *G06N 5/045* (2013.01)

(58) Field of Classification Search
CPC ..... G06F 18/2178; G06F 17/18; G06N 5/045; G06N 20/00; G06N 5/04
See application file for complete search history.

(56) References Cited

U.S. PATENT DOCUMENTS 10,452,992 B2 * 10/2019 Lee ........................ G06N 20/00
2020/0142737 A1    5/2020 Li
(Continued)

FOREIGN PATENT DOCUMENTS

WO          2019045758          3/2019

OTHER PUBLICATIONS

I Lage, et al, An Evaluation of the Human-Interpretability of Explanation, arXiv:1902.00006v2, 2019 (Year: 2019).*
(Continued)

*Primary Examiner* — Markus A. Vasquez
(74) *Attorney, Agent, or Firm* — Van Pelt, Yi & James LLP

(57)          ABSTRACT

A data stream is received. Data elements of the data stream are analyzed using one or more machine learning models and one or more machine learning prediction explanation implementations. Different candidate presentations are tested. The different candidate presentations are associated with machine learning results provided to different reviewers in a group of human-in-the-loop reviewers that review predictions of the one or more machine learning models. The different candidate presentations include different explanations generated by the one or more machine learning prediction explanation implementations and at least one control candidate presentation corresponding to an absent explanation. Different aspects of the testing are monitored. Results (Continued)

of the monitoring are used to make a selection among the different candidate presentations.

20 Claims, 9 Drawing Sheets

(56)                    References Cited

U.S. PATENT DOCUMENTS

| | | | |
|---|---|---|---|
| 2020/0202179 A1 | 6/2020 | Rajarathinam | |
| 2021/0027191 A1* | 1/2021 | Sinha | G06N 5/045 |
| 2023/0102324 A1* | 3/2023 | Suzuki | G06N 20/00 |
| | | | 706/12 |

OTHER PUBLICATIONS

F Poursabzi-Sangdeh, et al, Manipulating and Measuring Model Interpretability, arXiv:1802.07810v2, 2018 (Year: 2018).*

S García , et al (A study of statistical techniques and performance measures for genetics-based machine learning: accuracy and interpretability, Soft Comput., 13 (10) 2009, pp. 959-977 (Year: 2009).*

R Kohavi, et al, Online Controlled Experiments and A/B Testing. In: Sammut, C., Webb, G.I. (eds) Encyclopedia of Machine Learning and Data Mining. Springer, 2016 (Year: 2016).*

H P Kothandapani, Application of Machine Learning for Predicting U.S. Bank Deposit Growth: A Univariate and Multivariate Analysis of Temporal Dependencies and Macroeconomic Interrelationships. J. Empir. Soc. Sci. Stud. 4(1) Jan. 2020, pp. 1-20 (Year: 2020).*

Doshi-Velez et al., Towards a Rigorous Science of Interpretable Machine Learning, arXiv:1702.08608, pp. 1-13, Mar. 2, 2017.

Lakkaraju et al., Interpretable Decision Sets: A Joint Framework for Description and Prediction, KDD, pp. 1-29, Aug. 2016.

Mohseni et al., A Multidisciplinary Survey and Framework for Design and Evaluation of Explainable AI Systems, Association for Computing Machinery, pp. 1-46, 2020.

Murdoch et al., Definitions, Methods, and Applications in Interpretable Machine Learning, PNAS, vol. 116, No. 44, pp. 22071-22080, 2019.

Narayanan et al., How do Humans Understand Explanations from Machine Learning Systems? An Evaluation of the Human-Interpretability of Explanation, pp. 1-21, 2018.

Rader et al., Explanations as Mechanisms for Supporting Algorithmic Transparency, CHI, pp. 1-13, 2018.

Schmidt et al., Quantifying Interpretability and Trust in Machine Learning Systems, Association for the Advancement of Artificial Intelligence, 2019.

* cited by examiner

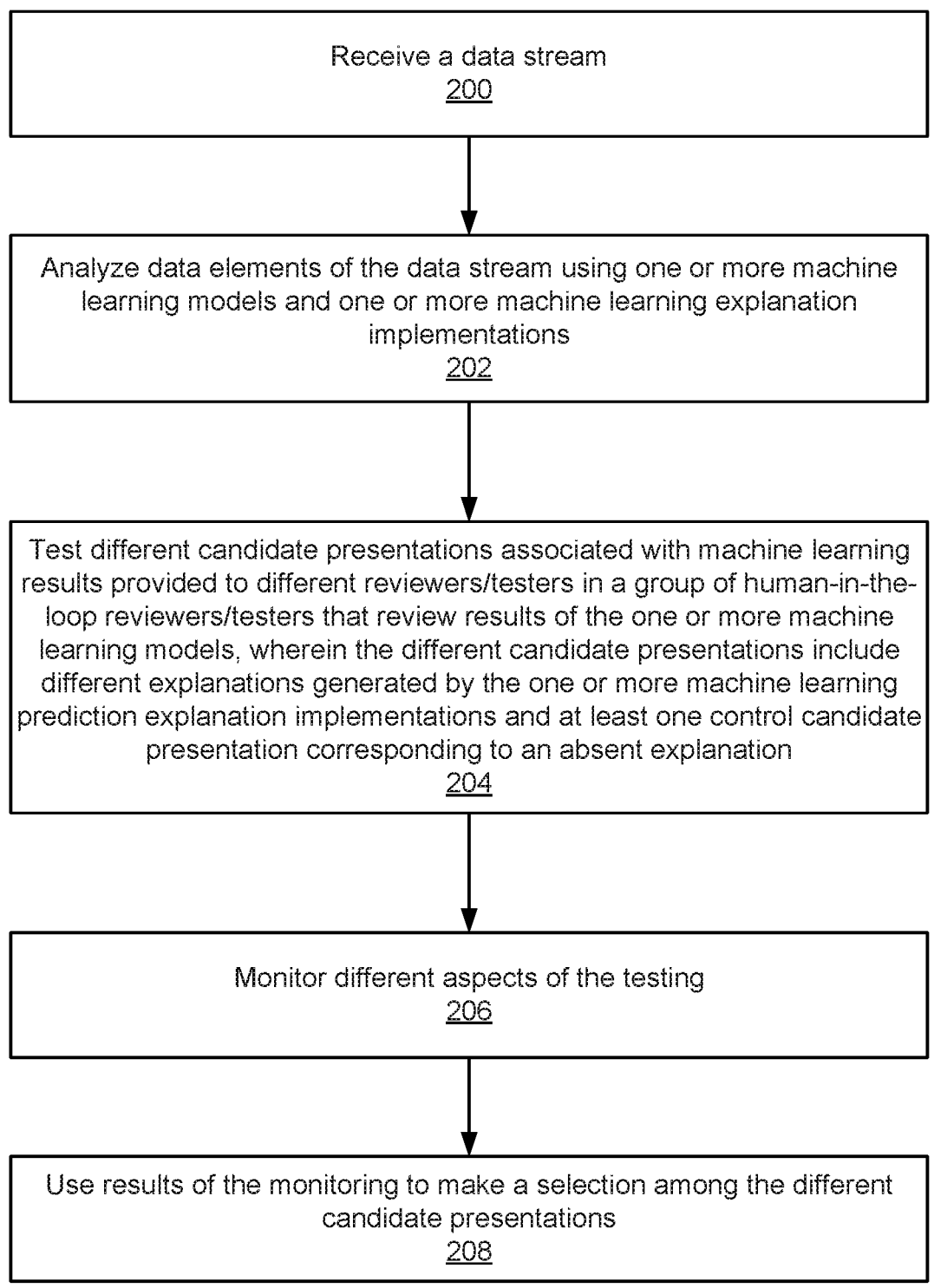

Receive a data stream
200

Analyze data elements of the data stream using one or more machine learning models and one or more machine learning explanation implementations
202

Test different candidate presentations associated with machine learning results provided to different reviewers/testers in a group of human-in-the-loop reviewers/testers that review results of the one or more machine learning models, wherein the different candidate presentations include different explanations generated by the one or more machine learning prediction explanation implementations and at least one control candidate presentation corresponding to an absent explanation
204

Monitor different aspects of the testing
206

Use results of the monitoring to make a selection among the different candidate presentations
208

FIG. 2

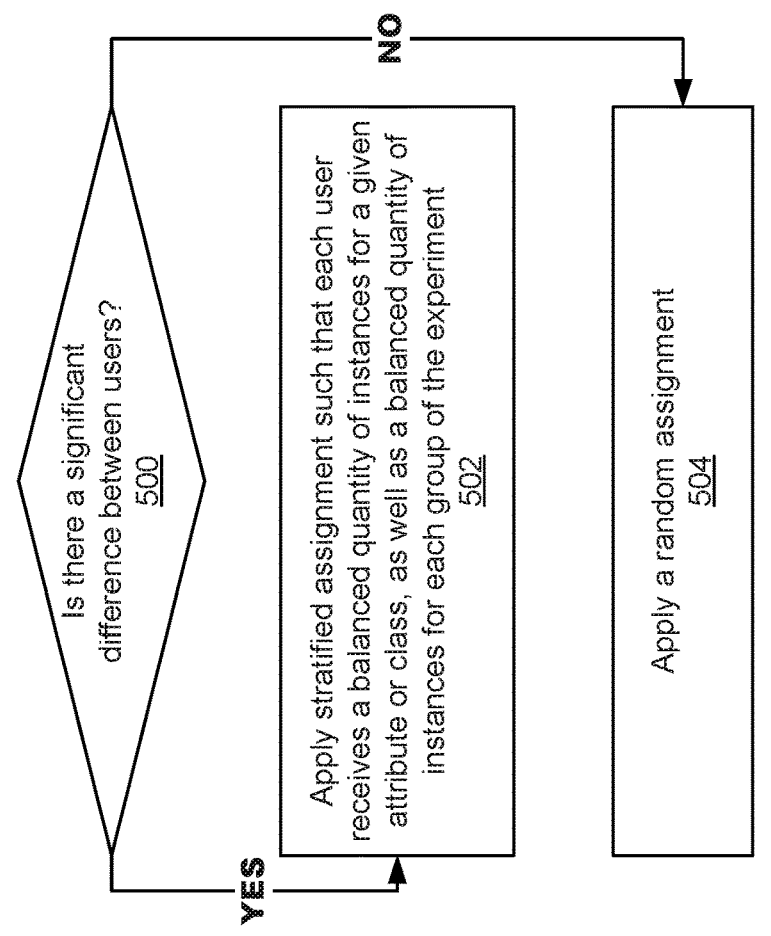

NO

Is there a significant difference between users?
500

Apply stratified assignment such that each user receives a balanced quantity of instances for a given attribute or class, as well as a balanced quantity of instances for each group of the experiment
502

Apply a random assignment
504

YES

FIG. 5

Determine whether user behavior relative to overall evaluation criteria (OECs) is different from one another
400

Determine stationarity of measurements for each user
402

Determine whether there is a statistically significant difference between different candidate presentations (e.g., variants)
404

Score
0.55

⊖ Explanations - Top Ordered Feature Contributions

FEATURE is VALUE

| | |
|---|---|
| ⊘ Approve | ⊗ Decline |

Amount is $55

Time since last events of shipp addr occured is 5 minutes and 35 seconds

Bill, shipp and IP city mismatch is True

Payment brand is Brand X

Hour of the day is 08:30

Time between user created data and trx data is Not available

1000

HUMAN-IN-THE-LOOP EVALUATION FOR EXPLAINABLE ARTIFICIAL INTELLIGENCE

CROSS REFERENCE TO OTHER APPLICATIONS

This application claims priority to U.S. Provisional Patent Application No. 63/056,152 entitled HUMAN-IN-THE-LOOP EVALUATION FOR EXPLAINABLE ARTIFICIAL INTELLIGENCE filed Jul. 24, 2020 which is incorporated herein by reference for all purposes.

This application claims priority to Portugal Provisional Patent Application No. 117353 entitled HUMAN-IN-THE-LOOP EVALUATION FOR EXPLAINABLE ARTIFICIAL INTELLIGENCE filed Jul. 19, 2021 which is incorporated herein by reference for all purposes.

This application claims priority to European Patent Application No. 21186755.1 entitled HUMAN-IN-THE-LOOP EVALUATION FOR EXPLAINABLE ARTIFICIAL INTELLIGENCE filed Jul. 20, 2021 which is incorporated herein by reference for all purposes.

BACKGROUND OF THE INVENTION

Often, a Machine Learning (ML) model is considered an opaque non-interpretable "black-box" function. Explainable Artificial Intelligence (XAI) is a research area in Machine Learning (ML) concerned with the development of methods to generate human-understandable explanations for a prediction of a ML model. XAI systems find application in a variety of settings such as risk assessment tools used in fraud detection, preventive healthcare, criminal justice system (e.g., in which the human judge makes a bail determination based on an algorithmic risk score of the defendant becoming a recidivist), among others. However, conventional XAI techniques are typically insufficient. In one aspect, typical XAI techniques do not have a systematic, objective, and reliable way of comparing explanation implementations on how they actually impact the human-expert-in-the-loop-in-real-world decision-making systems.

BRIEF DESCRIPTION OF THE DRAWINGS

Various embodiments of the invention are disclosed in the following detailed description and the accompanying drawings.

FIG. 2 is a flow diagram illustrating an embodiment of a process for human-in-the-loop evaluation for explainable artificial intelligence.

FIG. 4 is a flow diagram illustrating an embodiment of a process for hypothesis testing for human-in-the-loop evaluation for explainable artificial intelligence.

FIG. 5 is a flow diagram illustrating an embodiment of a process for assigning instances for human-in-the-loop evaluation for explainable artificial intelligence.

DETAILED DESCRIPTION

Figure 1:
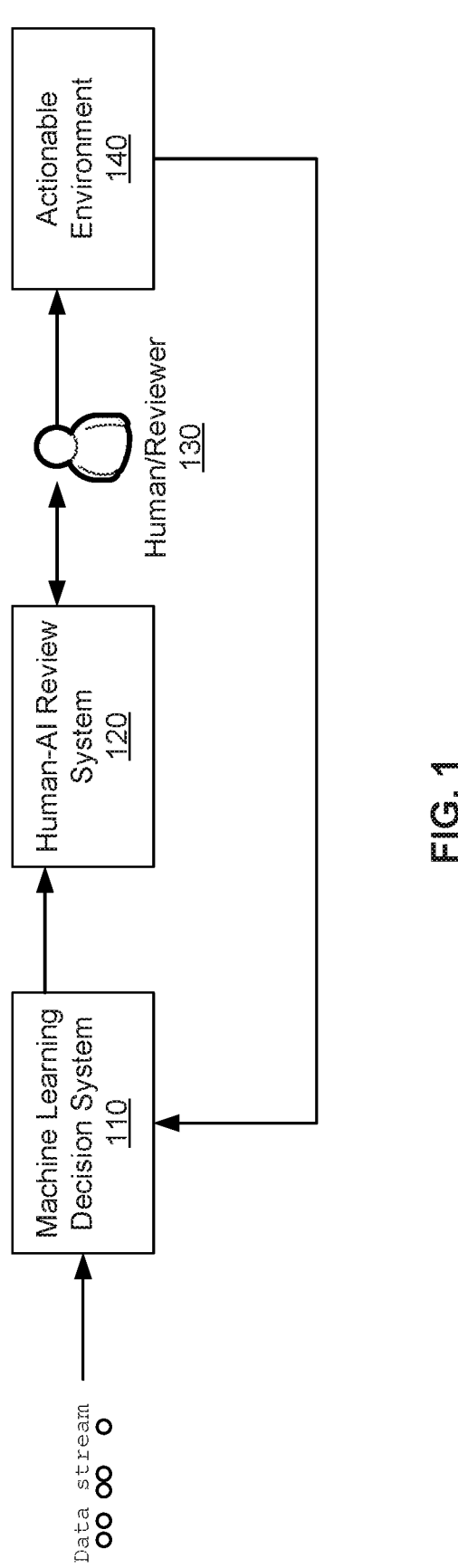
FIG. 1 shows an example of a workflow for a cooperative Human-AI decision-making system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of human-in-the-loop evaluation for explainable artificial intelligence (i.e., XAI) are disclosed. XAI is concerned with generating human-understandable explanations for a prediction of a machine learning model. A human-in-the-loop that needs to evaluate a result of a machine learning model to make a decision based on the result would benefit from an explanation produced by a XAI implementation. In various embodiments, the explainable artificial intelligence evaluation techniques are based on Randomized Control Trials (RCT), and use statistical tests depending on the distributions of the evaluation metrics. The disclosed techniques are metric-agnostic, and thus can be applied to any decision-making application, e.g., to measure the impacts on different stakeholders (e.g., developers, human-in-the-loop, etc.) involved in the system. Many examples herein use a fraud detection use case but this is merely exemplary and not intended to be limiting. In a fraud setting, examples of stakeholders include: fraud analysts who are responsible for reviewing suspicious transactions with (or without) the help of explanations, and developers who make decisions about which XAI implementation to deploy. Given that decisions of developers influence the fraud analysts' performance, decisions about which XAI implementation to deploy should be based on reliable measures of their impacts. With the RCT-based algorithm, it is feasible to evaluate the utility of each explanation implementation directly from the application including its impact on performance metrics of the user experience.

In one aspect, the disclosed explainable artificial intelligence evaluation techniques have a wide applicability. For example, the disclosed explainable artificial intelligence evaluation techniques can be used with various machine learning models and various XAI implementations (e.g., SHapley Additive exPlanations (SHAP), Local Interpretable Model-Agnostic (LIME), etc.). In another aspect, the disclosed explainable artificial intelligence evaluation techniques can evaluate the utility of each explanation implementation directly in the decision-making task and its impact on the user experience, and also supports human explicit feedback.

In various embodiments, the disclosed techniques include a plug-in that allows explainable artificial intelligence to be easily integrated in existing/standard Human-AI cooperative decision-making systems/workflows (e.g., systems/workflows that incorporate a collaboration between a human and an AI algorithm to make a decision). The plug-in system supports the collection and hypothesis testing of both implicit feedback metrics, such as human decision time or accuracy and explicit feedback metrics, such as human perception on the usefulness, relevance, completeness, and assertiveness of the observed explanation, through questionnaires. Hypothesis testing refers to performing tests on a group of hypotheses that can be accepted or rejected, given a set of observations and performing a statistical test. Usually, in RCTs (e.g., A/B Testing), the hypothesis test has a base hypothesis (or null hypothesis), in which all the variants share the same value or distribution of the evaluation metric, and also an alternative hypothesis, in which there is a significant difference between the variants value or distribution of the evaluation metric.

FIG. 1 shows an example of a workflow for a cooperative Human-AI decision-making system. Typically, a human (or reviewer) 130 obtains a "recommendation" (e.g., an high/low score) from an ML decision system 110 via a Human-AI review system 120. The system may include one or more ML models. The human 130 uses the recommendation to make an informed decision (e.g., a binary decision). The outcome, which happens in the actionable environment 140, is then fed back to the ML decision system 110 when it gets updated, i.e., (re-)trained.

In a criminal justice example, the human is a judge, who uses a recommendation made by the ML decision system 110 to decide whether to offer bail. The outcome is recidivating in the actionable environment (society). Taking the example of fraud detection, an analyst may review hundreds of ML model predictions every day and often has a limited amount of time to spend on each transaction. The reviewing process implies understanding the main entities involved in the transaction and to find suspicious behavior, such as the occurrence of many transactions from the same user account in a very short period of time. Ideally, the explanations produced by a XAI method would help the analyst-in-the-loop to understand why the model is scoring high a case so that the analyst would not need to spend much time verifying information from many different sources, and consequently, improving the analyst's efficiency.

However, current XAI evaluation methodologies typically do not provide sufficient reliable assessments of the added value of showing an AI explanation to help an human-in-the-loop in decision-making systems. The most intelligible existing evaluation practices rely on user-based evaluation but do not measure the impact on the human-in-the-loop efficiency nor account for the "cold start" problem during XAI evaluation. That is, the mental model of each human decision-maker needs time to adapt to changing information, from having to make decisions relying only on data and no AI, to using data together with AI prediction, and finally, data together with AI prediction and AI explanation. As a consequence, conventional techniques do not reliably isolate the contribution of adding an explanation to the existing information available to the human. Moreover, current implementations do not account for different user expertise, inter annotator agreement, or individual biases. Therefore, existing XAI explanation implementations might not correctly evaluate the effects of explanations in human-experts-in-the-loop scenarios and consequently cause incorrect conclusions on their effectiveness.

FIG. 2 is a flow diagram illustrating an embodiment of a process for human-in-the-loop evaluation for explainable artificial intelligence. The process may be performed by a system such as the one shown in FIGS. 6-9.

In the example shown, the process begins by receiving a data stream (200). The data stream can include one or more elements such as events or instances. For example, in a fraud detection use case, the data stream includes transactions to be scored based on the likelihood that a transaction is fraudulent.

The process analyzes data elements of the data stream using one or more machine learning models and one or more machine learning prediction explanation implementations (202). In various embodiments, the process queries one or more ML models to obtain a score associated with a data element. For example, in a fraud detection use case, ML models evaluate a transaction and assign a score corresponding to its evaluation of the likelihood that the transaction is fraudulent. The process can obtain explanations, which are factors or reasons for why the ML prediction (e.g., score) is the value that it is. The explanations can be obtained in a variety of ways. For example, the explanations can be generated by a variety of XAI implementations such as SHAP, LIME, or other XAI implementations (e.g., providing explanations such as feature attribution, concept, etc.). These explanations become candidate presentations to be shown to reviewers as follows.

The process tests different candidate presentations associated with machine learning results (e.g., groups of model predictions and associated explanations) provided to different reviewers/testers in a group of human-in-the-loop reviewers/testers that review predictions of one or more machine learning models (204). The different candidate presentations include different explanations generated by one or more machine learning prediction explanation implementations and at least one control candidate presentation corresponding to a blank or an absent explanation. The candidate presentations are sometimes referred to as an "experiment." An objective of the experiment is to evaluate and choose which is the best combination of machine learning prediction explanation implementation and ML model for a given use case. This may be achieved by measuring the impact on a group of overall evaluation criteria (OECs) of showing the XAI explanations and the ML model score or decision to a group of one or more reviewers/testers.

An OEC is a definable objective variable measured in an experiment. The definition of the OEC impacts aspects such as the statistical test to be used, the sample size required to have a desired statistical power and significance level, and the usefulness of the test in itself. There are various ways to define the OEC. An OEC can be selected that is highly correlated to the true objective of the experiment or that is a direct measure of it. This affects the usefulness of the test and the relevancy of its results. Also, an OEC with low variance can be selected.

The OECs include one or more metrics, related to the performance of the user in the assigned task and the inter-action with the system, as well as the user's perception of usefulness, clarity, variety and other qualitative measures of the explanation. In some embodiments, a first group of metrics is referred to as "implicit feedback" and a second group of metrics is referred to as "explicit feedback." As an example, for the use case of fraud detection, the implicit metrics are the time of analysis (in seconds) and a compari-son result between the decision label and the ground truth, while the explicit metrics are gathered through a question-naire (e.g., measured in a Likert scale). An example ques-tionnaire includes one or more questions such as:

The explanation was useful to help me make a decision.

Strongly disagree

Disagree

Neither

Agree

Strongly agree

These examples are merely exemplary and not intended to be limiting. Different metrics may be defined depending on the use case, and these metrics are generally referred to as "user-defined metrics" or "UD metrics".

In the initial iteration, it is typically not possible to fully describe the distributions of each of the OECs. However, some characteristics are inherent from the collected data, and the family of distribution can be inferred a priori. For the example of fraud detection, the decision data will produce a binary result, and therefore will follow a Bernoulli distri-bution for a single experimental unit and a binomial distri-bution for a given sample. On the other hand, both the time of analysis and the questionnaire will produce non-binary results, and while a Likert scale produces a discrete number of possibilities for each possible answer, the analysis time produces a continuous random variable.

In various embodiments, candidate presentations associ-ated with machine learning results are selected by running A/A and A/B/n Tests (further described with respect to FIG. 3), determining and applying statistical tests for each OEC (further described with respect to FIG. 4), and assigning candidate presentations to different reviewers in a group of human-in-the-loop reviewers (further described with respect to FIG. 5). As further described herein, depending on the statistical tests performed to the user, the assignment can either be random or stratified.

The process monitors different aspects of the testing (206). In various embodiments, the process observes user interaction by presenting candidate presentations in a graphical user interface of an interface human-AI review system (further described with respect to 680). An example process for monitoring testing is further described with respect to FIG. 6.

The process uses results of the monitoring to make a selection among the different candidate presentations (208). The selected presentation from among the candidate pre-sentations is sometimes referred to as the "best variant."

Figure 3:
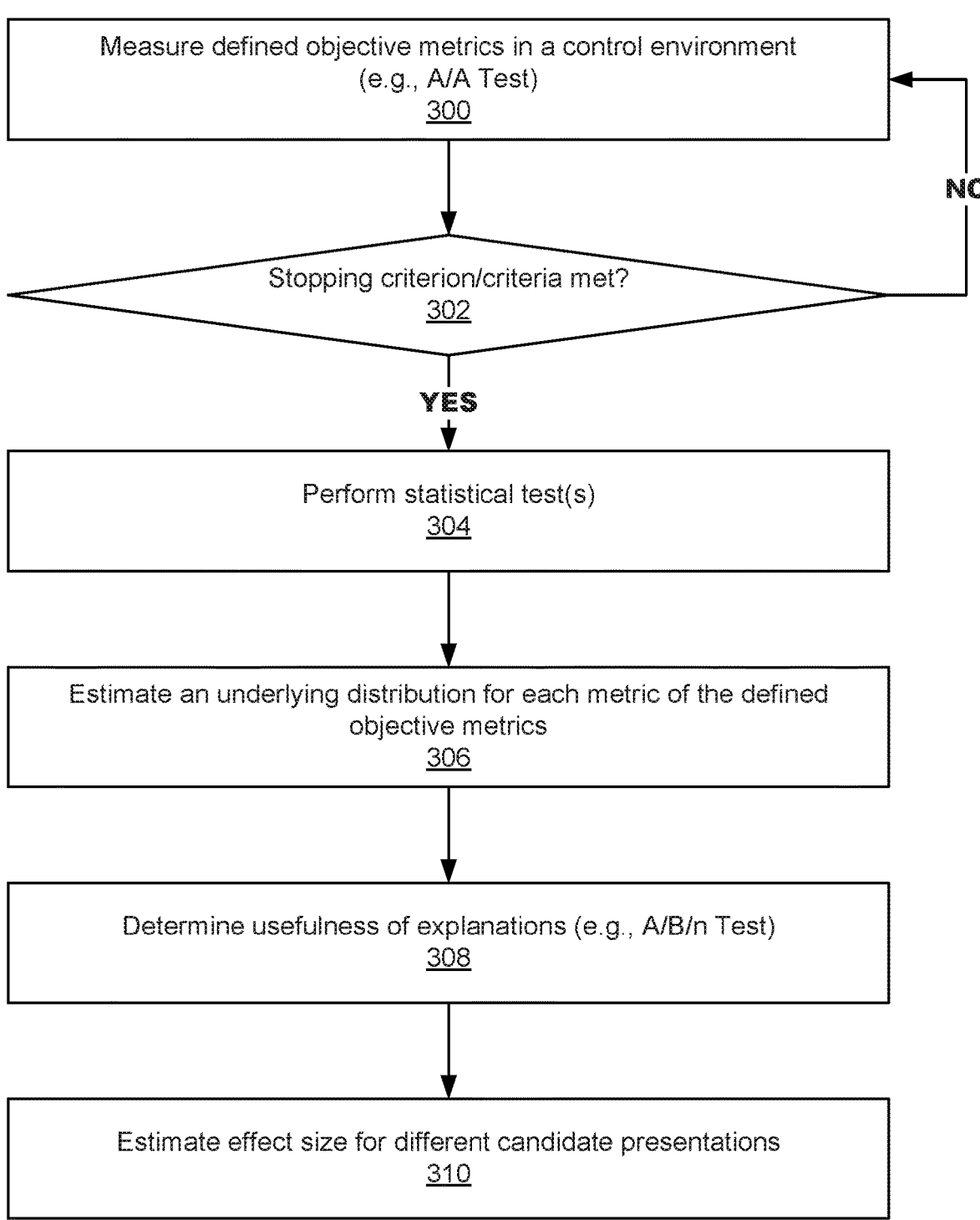
FIG. 3 is a flow diagram illustrating an embodiment of a process for running A/A and A/B/n Tests for human-in-the-loop evaluation for explainable artificial intelligence.

FIG. 3 is a flow diagram illustrating an embodiment of a process for running A/A and A/B/n Tests for human-in-the-loop evaluation for explainable artificial intelligence. The process may be performed by a system such as the ones shown in FIGS. 6-9. The process may be performed as part of another process such as 204 of FIG. 2.

In the example shown, the process begins by measuring defined objective metrics in a control environment (300). The defined objective metrics can be measured using an A/A Test that proceeds to an A/B/n Test. This can serve one or more objectives including the following. One objective is to guarantee that the pipelines are serving and collecting the correct data. Another objective is to determine if the behav-ior of each user is significantly different from one another on the objective metrics. Yet another objective is to have data for an initial estimate of the distribution of each objective metric. Yet another objective is to determine whether the decision process of each user is relatively similar, with an inter-annotator agreement metric. Yet another objective is to check whether the distribution of each metric is relatively stable over time. In various embodiments, the A/A Test step is served with no explanations, to replicate the environment from the usual process.

The process determines whether one or more stopping criteria is met (302). In various embodiments, the A/A Test has two stopping criteria, either (i) the inter-annotator agree-ment and the stationarity test reach an acceptable (threshold) value, or (ii) the review set is depleted. Inter-annotator agreement refers to whether or to what degree different users/reviewers agree, as further described herein. Station-arity refers to whether an annotator/reviewer/tester has a stable performance over time (e.g., whether the annotator/reviewer/tester has a relatively constant decision time instead of a decreasing or increasing decision time over the experiment), as further described herein. If the stopping criterion/criteria is not met, the process returns to 300 to continue to measure defined objective metrics in a control environment. Otherwise, if the stopping criterion/criteria is met, the process proceeds as follows.

The process performs one or more statistical tests (304). In various embodiments, after the A/A Test, the process performs a statistical test to determine whether there is any significant difference between users/reviewers, in any one of the defined OECs. If any of the statistical tests indicates that users do not have the same behavior, then the assignment method for treatment groups is changed, and the statistical tests to evaluate the variants are also changed. For example, if a statistical test returns a small p-value and, consequently, this indicates that the null hypothesis that every user has the same behavior is rejected.

Various statistical tests including one-factor tests, two-factor (paired) tests, and stability tests can be employed. In one statistical test, which can be performed at the end of an experiment, the null hypothesis is that the mean value of a given OEC is the same for all the groups, while the alter-native hypothesis is that the mean value of a given OEC is different between two or more groups. This determines whether paired statistical tests between the groups should be employed or not, in the case of two or more treatment groups. In the case of only one treatment group, a single test per OEC will suffice to determine if the treatment group is better than control.

There is also the possibility of users displaying different behavior, and requiring a block design or stratification (e.g., each experimental unit is divided in a broader group that can influence the outcome of the experiment). For example, in response to a determination that there is a significant dif-ference between users, a stratified assignment is applied such that each user receives a balanced quantity of instances for a given attribute or class, as well as a balanced quantity of instances for each group of an experiment. In various embodiments, the statistical tests employed at this stage are the ANOVA tests for continuous and discrete variables, using Two-way ANOVA in case of a block design. In the case of only existing one variant, a T-Test is employed. For the binary variables, the employed test is the $\chi^2$ test, while an analysis of Generalized Linear Models (GLMs) is employed in case of a block design. In the case of only existing one variant, a $\chi^2$ test is employed.

Paired tests compare differences between unique combinations of all the groups, and are the tests used for the case of only one variant (T-Test and $\chi^2$ test), applying the Bonferroni correction for multiple comparisons. From these tests, it is possible to conclude if there is one or more variants that deviate from control significantly (e.g., deviates by more than a specified threshold amount), and which variant is statistically better.

In the A/A test step, it is also possible to analyze whether there are any significant differences between the users that are going to partake in the experiment. Here, the null hypothesis is that the mean value of the OECs is the same for all the users, while the alternative hypothesis is that the mean value of the OECs is different between two or more users. In various embodiments, the tests used are the same for the one factor analysis, depending on the variable type; One-way ANOVA for more than two users and continuous or discrete variables, T-test for two users and continuous or discrete variables, $\chi^2$ test for binary variables.

A stability test, such as the Augmented Dickey-Fuller test, can be applied to determine whether the review process is stationary, i.e., the underlying distributions do not change and converge over time. It can be helpful to determine that the review process is stationary because this indicates that the behavior of each reviewer/user is stable. Returning again to the fraud detection example, typically the biggest source of instability for a user is the "cold start," where a user performs sub-optimally in the start of the experiment (e.g., because the user is not used to the version of the software being tested, or the objectives and environment of the task are different) but the true performance of the user is reached, after some time.

The process estimates an underlying distribution for each metric of the defined objective metrics (306). This determines the theoretical sample size for a given statistical power, significance level, and effect size. This helps to determine whether the sample gathered for the A/B/n Test and the scheduled user time for the experiment is sufficient.

The process determines the usefulness of explanations (308). The usefulness of explanations can be evaluated using an A/B/n Test. Examples of explanations are those described with respect to FIG. 2. In various embodiments, there is the definition of an Agreement set and a Review set. The Agreement set is used to recalculate the inter-annotator agreement metric, when serving different explanations. This will help measure whether the explanations have an impact on the decision-making process of reviewers/testers. The Review set will be assigned either randomly or based on the class of each instance to the users (stratified or block), without repetition. In the same way, the treatment group will be assigned to each pair user-instance. In this case, the group assignment can be performed to balance the number of explanations for each user with a stratified or block assignment or can be performed randomly.

The process estimates an effect size for different candidate presentations associated with machine learning results (310). In various embodiments, after the statistical tests are run, the process estimates the effect size for each variant (each candidate presentation) that is statistically significantly better than a control variant and for each OEC, and then multiplied by a weight vector w. This result is what is designed as a composite effect size. The variant with a significant difference from control with the most positive composite effect size can be chosen as best variant (e.g., best variant 990 of FIG. 9).

FIG. 4 is a flow diagram illustrating an embodiment of a process for hypothesis testing for human-in-the-loop evaluation for explainable artificial intelligence. The process may be performed by a system such as the ones shown in FIGS. 6-9. The process may be performed as part of another process such as 206 of FIG. 2. That is, the process monitors aspects of testing (e.g., A/A Test and A/B/n Test) as follows.

The process begins by determining whether user behavior relative to overall evaluation criteria (OECs) is different from one another (400). For example, an A/A Test determines whether user behavior relative to the OECs is different from one another. This test is relevant throughout an experiment, to determine the type of assignment that will be used for instance classes and treatment groups, as well as to determine the statistical tests to be employed.

The process determines stationarity of the measurements for each user (402). In various embodiments, this is an additional hypothesis test performed during the A/A Test step. The process tests the stationarity of the measurements for each user, applied to the observed average of the last measurements. This test is used since it is desirable for the review process to be stable over time.

The process determines whether there is a statistically significant difference between different candidate presentations associated with machine learning results (404). For example, an A/B/n Test determines whether there is a statistically significant difference between variants. This test determines whether there is a better solution than control, and ultimately returns the best possible tested variant.

The tests used to check whether there is a significant difference between the users depend on the type of data that was gathered. For continuous data (e.g., amount, time of analysis for the use-case of fraud detection), one suitable test is the One-way ANOVA, which takes into account one factor (i.e., the user), for normally distributed random variables. In the case of having two users (i.e., reviewers/testers) testing the system, a suitable test is the T-test, since there is no need for multiple comparisons. For binary data and proportions, (e.g., success rate, recall for the use-case of fraud detection), a suitable test is the $\chi^2$ test, which is independent of the number of users.

In various embodiments, the performed tests depend on the result of 400 (the A/A Test). If the users are considered different, they represent an additional factor to the experiment, besides the variant. In the case of the two factor experiment, suitable tests include a Two-way ANOVA for continuous data and the $\chi^2$ test applied to GLMs for binary and proportions data The criteria to detect a significant difference, either between the users or between the variants might be challenging, since the number of tests is dependent on the number of defined OECs. As a measure of identifying significant differences, one criterion that can be used is: if in any of the OECs tests a significant result is detected, then the null hypothesis is rejected and the groups are considered different.

FIG. 5 is a flow diagram illustrating an embodiment of a process for assigning instances for human-in-the-loop evaluation for explainable artificial intelligence. The process may be performed by a system such as the ones shown in FIG.

6-9. The process may be performed as part of another process such as 208 of FIG. 2. That is, the process can be performed to make a selection among the different candidate presentations associated with machine learning results.

The process begins by determining whether there is a significant difference between users (500). In various embodiments, the process uses a maximum difference threshold parameter to determine whether there is a significant difference between users. This threshold defines the maximum tolerated difference between the sub-group with most assignments to a given user (independent of the sub-group being determined by an attribute, class, or experimental group) and the sub-group with least assignments. If the difference is below the threshold, then a random assignment is performed as further described with respect to 504. If the difference is equal or larger than the defined threshold, a stratified assignment is performed as further described with respect to 502.

If there is a significant difference, the process proceeds to apply a stratified assignment such that each user receives a balanced quantity of instances for a given attribute or class, as well as a balanced quantity of instances for each group of an experiment (502). In various embodiments, the stratified strategy is adopted when a significant difference is found between users, so that each user receives a balanced quantity of instances for a given attribute or class, as well as a balanced quantity of instances for each group of the experiment. For example, the assignment automatically goes with the sub-group with the least assignments.

Otherwise, if there is not a significant difference, the process applies a random assignment (504). This means that each user has a random number of instances for a given attribute or class.

Figure 6:
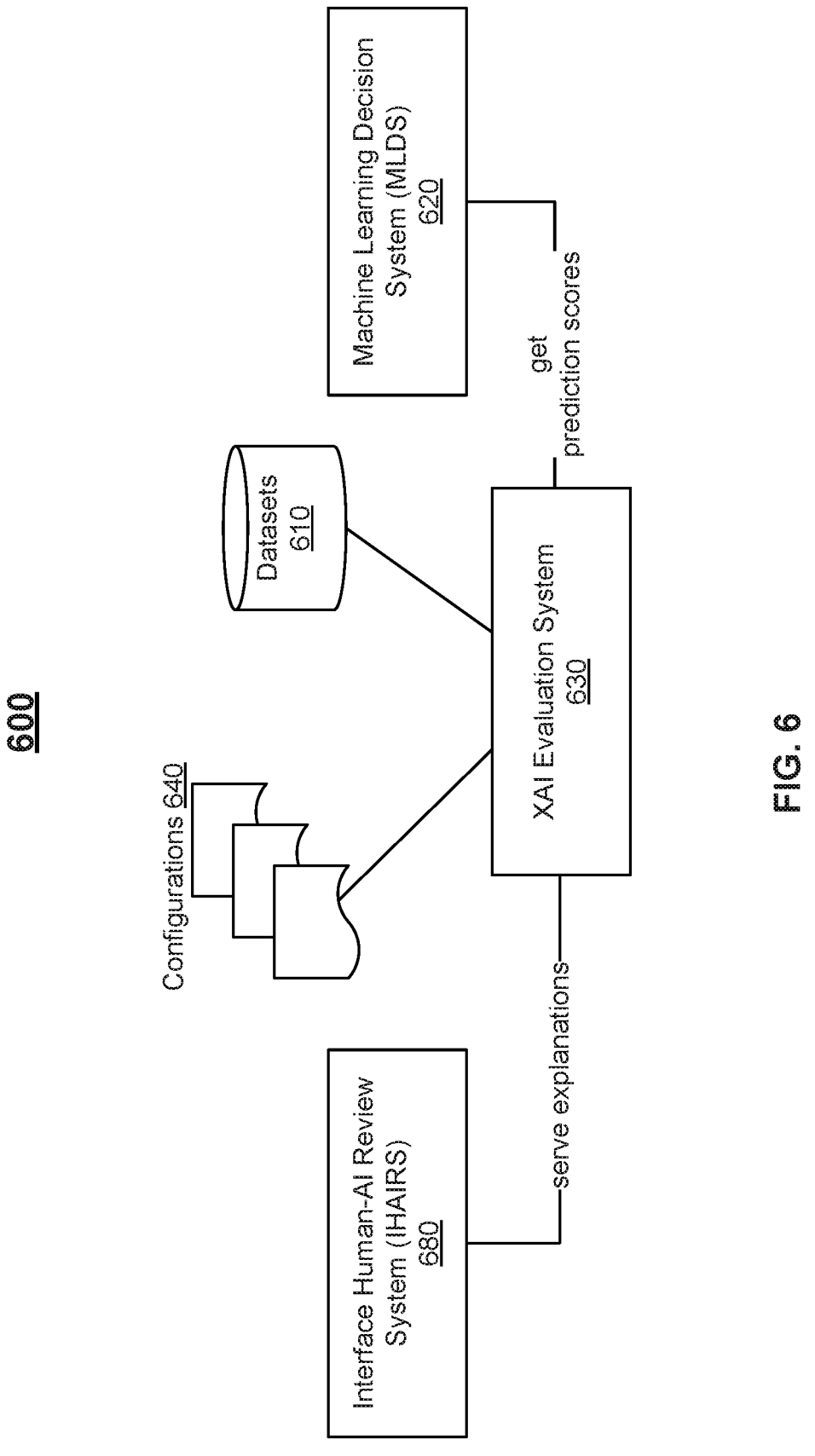
FIG. 6 is a block diagram illustrating an embodiment of a system for human-in-the-loop evaluation for explainable artificial intelligence.

FIG. 6 is a block diagram illustrating an embodiment of a system for human-in-the-loop evaluation for explainable artificial intelligence. Overall system 600 includes interface XAI evaluation system 630, human-AI review system (IHAIRS) 680 and machine learning decision system (MLDS) 620.

IHAIRS 680 is configured to provide a user interface. For example, IHAIRS renders information about particular data instances to users through interfaces and collects metrics for experiments. An example of graphical user interface is further described with respect to FIG. 10.

MLDS 620 is configured to score data instances. In the context of XAI evaluation, the MLDS represents the model (or models) that the explanation implementations try to explain.

In operation, given the appropriate configurations 640 and datasets 610, system 600 creates explanations for each explanation implementation using, when necessary, the MLDS to obtain the prediction scores. For example, when evaluating perturbation-based explanation algorithms, such as Local Interpretable Model-Agnostic Explanations (LIME), the score associated with each perturbation is computed using the MLDS. Then, these explanations are served to IHAIRS 680, which renders them to the users through an exposed user interface and the feedback is returned to one or more components of system 600 to be analyzed and evaluated. System 600 determines one or more combinations of XAI implementation and ML model that produced the best results (sometimes called the "best variant").

Figure 7:
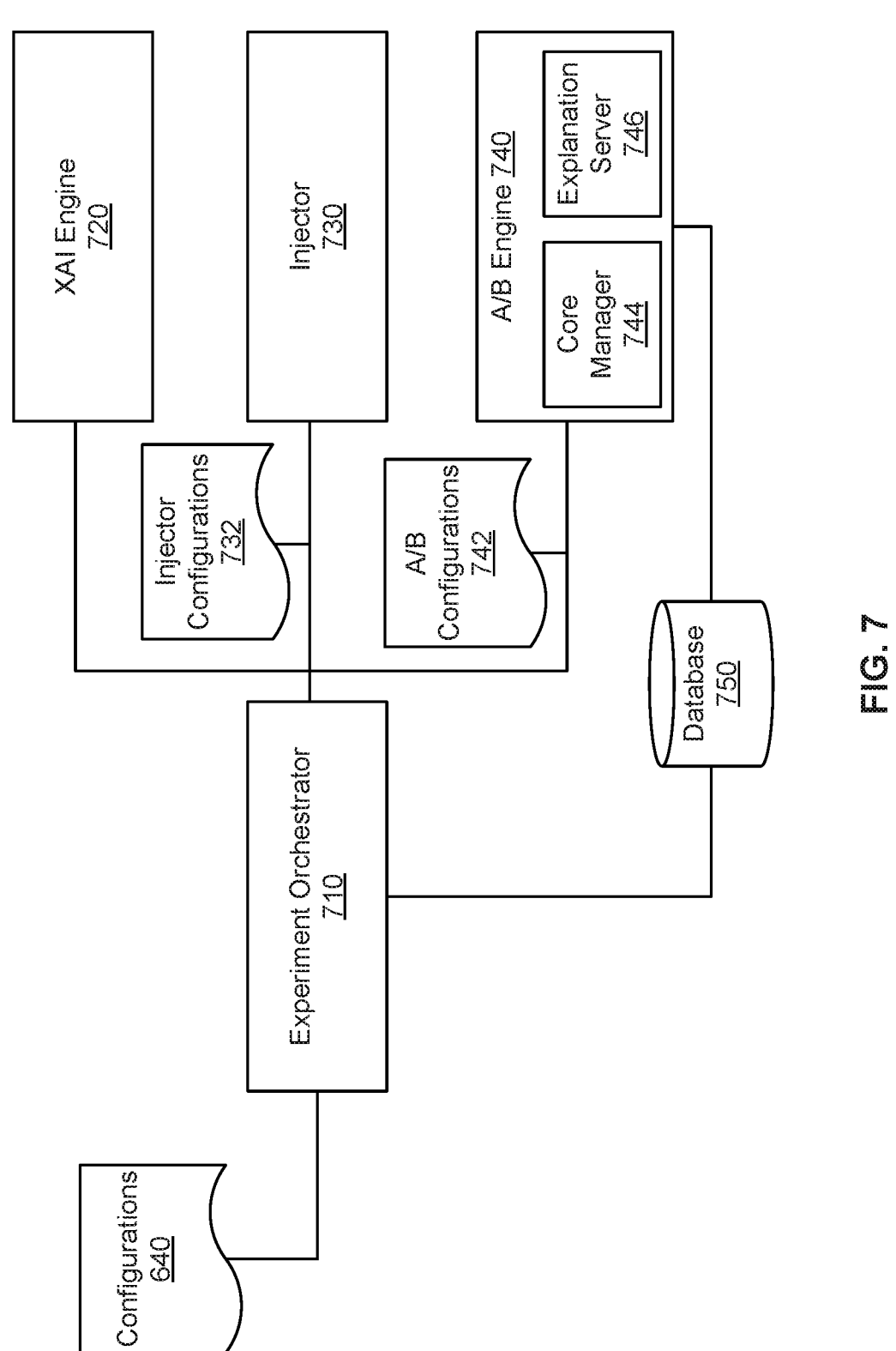
FIG. 7 is a block diagram illustrating an embodiment of a system for human-in-the-loop evaluation for explainable artificial intelligence.

FIG. 7 is a block diagram illustrating an embodiment of a system for human-in-the-loop evaluation for explainable artificial intelligence. The system includes Experiment Orchestrator 710, XAI engine 720, injector 730, A/B engine 740.

A/B engine 740 is configured to create and manage the experimental setup of any experiment (e.g., random experiment), including the design strategies, the inter-annotator agreement, among others. It is also responsible for serving the different variants or, in the XAI evaluation case, the explanations and models of the experiment. In various embodiments, A/B engine is a server.

In various embodiments, the A/B engine includes core manager 744 (sometimes called a "core server") and explanation server 746.

The core manager 744 is configured to assign variants, collect metrics, and/or generate IDs. In various embodiments, the core manager includes a variant assignment engine that assigns different variants during an experiment. When used as an XAI evaluation system, this component guarantees the different explanation implementations are shown according to a pre-configured design strategy (e.g., random or stratified). It implements the fundamentals of A/B testing, including various design strategies such as block designs (blocking) or factorial designs. An example of a block design is where each experimental unit is divided in a broader group that can influence the outcome of the experiment, e.g., previous known conditions on a novel drug treatment or platform when viewing a website. By balancing the number of times a variant is shown to each Block, the influence of a grouping variable will be reduced and ideally eliminated. Factorial designs enable testing of multiple overlapping variants, as well as checking the influence of the interactions between them, without having to test every possible combination of variants. Each design strategy creates a set of assignments which are stored in the form of metadata in the system's metadata database (DB) 750.

In various embodiments, the core manager includes a metrics collector that collects metrics by collecting annotation feedback. A/B testing evaluates and compares different variants, determining the impact of each one according to potentially multiple aspects, including the impact on the performance and/or usability of a given interface. When used as an XAI evaluation system, one is typically concerned with not only the increase in the performance, but also the utility of the different explanations for performing the task itself. This component implements mechanisms to support the collection of data related to the experiment, including the reviewers'/testers'/annotators' feedback, their time to complete the task, and the task result. The data is persisted in the metadata database 750 and can then be used for computing and quantifying the impact of the different variants.

In various embodiments, the core manager includes an ID generator that generates IDs to help with inter-annotator agreement. The core manager creates proxy identifiers. In one example, the default mechanism uses both the user's and the instance's original identifiers to create a new unique identifier that can safely replace the original one. This may be useful in situations involving stricter business constraints, such as demanding unique identifiers or requiring that each identifier appears once in the entire system (e.g., some systems might impose that each instance is only seen by a single user)

The explanation server 746 is configured to handle and serve explanations including formatting the explanations. In various embodiments, the explanation server includes an explanation controller 848 that implements mechanisms to handle and serve different explanations. For example, this includes the exposure of a Representational State Transfer (REST) endpoint which, upon receiving a unique identifier, will validate it and use it to determine which explanation (or variant) to retrieve. In various embodiments, the explanation server includes an explanation manager that implements additional processing mechanisms to support marshalling and/or unmarshalling of explanations to standard formats ready for consumption. This separates the system-specific explanation format (the metadata representation) from the consumption format.

In various embodiments, the A/B Engine 740 is able to run in online or offline mode. In the online mode (production mode or streaming mode), the group assignments are generated on-the-fly as each request arrives. This supports the execution of experiments in a production environment, where the assignments are determined dynamically for each experimental unit, triggering the creation of associated metadata and its persistence in the metadata database 750.

In the offline mode (or batch mode), the group assignments are generated in bulk for a set of experimental units prior to the actual experiment and stored in the metadata database 750. This execution mode may be suitable for situations requiring the a priori definition of the full experiment, as to ensure a finer control over the experiment. In this mode, given an experimental unit's identifier, the variant assignment engine looks for the corresponding assignment in the metadata database. By creating the assignments prior to the explanations serving, the offline mode incurs almost no overhead while serving them.

XAI engine 720 (sometimes called "OpenXAI") is configured to implement the different explanation implementations to be considered in the experiments. A randomized experiment (or A/B test) evaluates and compares different XAI implementations. XAI engine is configured to create abstractions 822 that allow for a modular and easily-extensible design on XAI implementations. In various embodiments, it leverages the object-oriented programming (OOP) paradigm to abstract the differences in the Application Programming Interfaces (APIs) of multiple XAI implementations in a single and uniform interface, common to all explainers in the system. In order to abstract the differences in the XAI implementations' API, the XAI engine takes into account factors including: (1) an implementation's behavior, which includes its list of methods, and (2) data representation, which includes the way explanations are represented.

Regarding the first aspect (an implementation's behavior), each implementation is expected to provide a way to compute some type of explanation for a given data instance, and, consequently for a given dataset. The XAI engine wraps the latter into two methods: explain instance and explain all, respectively. Even if the implementation itself does not provide a method for explaining all instances of a dataset, the former can be used to iteratively create explanations for a given dataset.

Regarding the second aspect (data representation), each XAI may lie on different data structures and create different representations depending on the data and model settings. The XAI engine normalizes a format of explanation analysis by transforming the data returned by each method into a format known to the system. Consequently, in addition to creating wrappers for the methods, each individual explainer also has a parsing method to automatically convert the explanations into an OpenXAI format. The snippet below represents an example of a normalized explanation in the OpenXAI format for the Adult Income dataset.

```
{
    feature_id: 1234
    feature_name: Hours per week
    feature_value: 40
    feature_contribution: 0.42
    feature_operator: <= 40.00
}
```

The XAI engine allows for the system to remain agnostic to the specifics of each XAI implementation, while also creating the mechanisms for easy integration of additional explainable implementations.

Injector 730 is configured to transform the data and, optionally, inject the resulting data into the desired backends. Running randomized experiments in fast-changing data-driven environments may involve dealing with different systems and or artifacts, each with potentially different schemas. In various embodiments, other data schemas can be inferred without loss of information by transforming the original data source into an expected format. Moreover, in some cases, depending on the experiment being run, different backends are populated with such transformed data. In various embodiments, the injector is configured to inject the transformed data in different backend systems, such as database (DB) engines or files in Hadoop Distributed File System (HDFS).

In various embodiments, the transformations are agnostic to the data and are configured prior to their execution. For example, an administrator (or other user familiar with the original and end-use datasets as well as which data transformations or operations are to be applied) can perform the configurations.

Although the decoupling of the data transformations from the code allows for greater modularity and flexibility of the code, it also inflicts additional efforts on the users. In one aspect, creating the initial configuration may be a laborious and tiresome process, especially, if it involves multiple composite transformations and several backends. In another aspect, the transformations can be complex, and more complex transformations often result in larger configuration files with higher verbosity. One advantage of creating the initial file is that it can be created once and then re-used as a template for future experiments, thus significantly decreasing the burden associated with the definition of the injector configurations in future experiments.

In various embodiments, the injector module includes injectors (e.g., database (DB) injector, file injector, spark injector, composite injector, etc.) and default operations. In some embodiments, a modular and re-usable system for different types of data transformation is implemented by leveraging the OOP paradigm to setup a system of classes exposing a single method named "inject." At the top of the class hierarchy, the Injector class creates the abstract methods to be implemented by all other injectors, and implements the basis mechanism for parsing the configurations. The subclasses reflect different integration needs, including files, database engines, or even other more complex systems involving the composition of multiple integrations.

A spark injector abstracts the injections concerned with the transformations of data loaded using the big data processing framework Apache Spark®. A file injector or database injector injects the data into the desired file system (e.g., HDFS, Unix file system), or database engine, respectively. A composite injector (e.g., 832 of FIG. 8) includes multiple injectors and accommodate more complex environments where it might be necessary to apply a set of transformations and then immediately inject them into specific backends, e.g., to run a pipeline of injectors.

In various embodiments, a spark injector applies row-wise transformations based on the value of several columns, if desired. Therefore, given any dataset, the number of rows is preserved regardless of the transformations being applied. The same does not apply in terms of the columns whose number may vary depending on the transformations applied in various embodiments. Examples of possible transformations include, but are not limited to, the initialization of multiple output columns based on the value of at least one input column, or the application of more complex and customized transformation methods.

The decoupling between data and code (or functionality) removes the need for modifying and maintaining different versions of the code to satisfy the requisites of different experiments and systems. In addition to the injectors themselves, the injector module also exposes a list of default operations that can be used out-of-the-box in the configuration files, which can be grouped in one of four functional categories:

COPY: copies the content of the input column to the output column,

DEFAULT: initializes all the values of the output column with the specified default value, NULL: initializes all the values of the output column to null, TRANSFORM: applies a transformation to the input column and stores it in the output column.

In various embodiments, the TRANSFORM category incorporates not only complex transformations, including normalization and nested data transformations (e.g., JSON, vectors/arrays), among others, but also the mechanisms to support user-defined transformations. The latter allows for a greater adaptability towards the different requirements that may arise from running experiments in different contexts (e.g., integration with different sub systems, different data sources) business requirements. One way to achieve this functionality is to dynamically load methods and/or classes and then apply to each column. An example of a TRANSFORM configuration in a Python-based implementation is: [username lowered, string.lower, username].

The following figure shows an example of how the system of FIG. 6 and the system of FIG. 7 can be combined to provide an XAI evaluation system.

Figure 8:
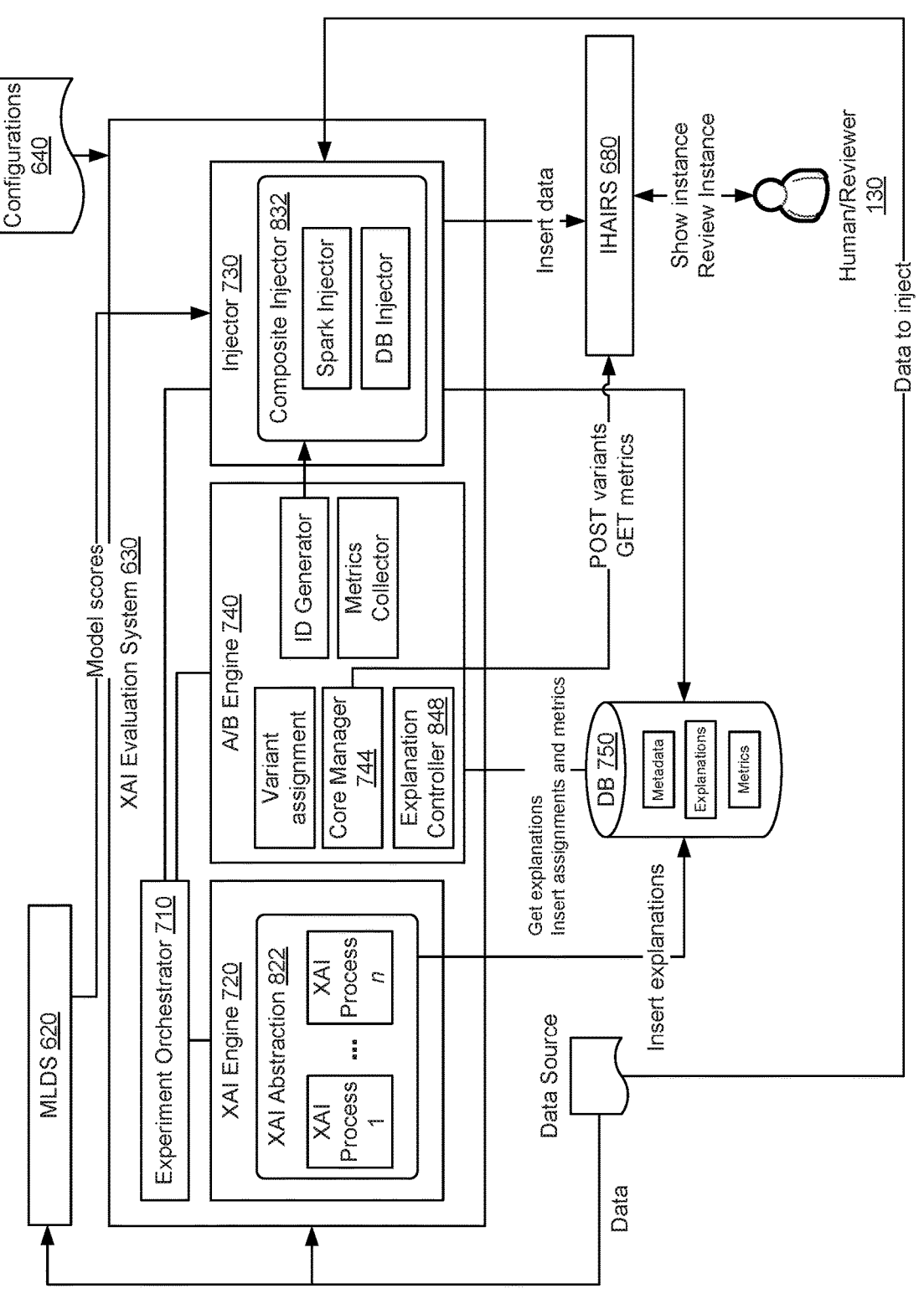
FIG. 8 is a block diagram illustrating an embodiment of a system for human-in-the-loop evaluation for explainable artificial intelligence.

FIG. 8 is a block diagram illustrating an embodiment of a system for human-in-the-loop evaluation for explainable artificial intelligence. Each of the components function like their counterparts in FIG. 6 and FIG. 7 unless otherwise described herein.

Experiment Orchestrator 710 is configured to coordinate one or more experiments and interface with an end-user. In various embodiments, the experiment Orchestrator loads the configurations and initializes the necessary backend(s) to ensure proper functioning of the system. The Experiment Orchestrator is configured to orchestrate one or more of the following tasks:

Bootstrap Metadata: generate and store randomized experiment metadata into a metadata database (e.g., 750). This metadata includes information about datasets, features, model configurations, explainers (if applicable), information about the experiment and different configurations that parameterize it, etc. In various embodiments, the Experiment Orchestrator uses this information to validate the experiment throughout different execution points and also to boost performance in future runs, as it prevents the re-execution of tasks whose results are already available in the database.

Generate Explanations: generate explanations and store them in the metadata database. It generates the variants for a given randomized experiment prior to its execution, which minimizes the overhead when serving explanations.

Perform Assignments: generate proxy identifiers to guarantee uniqueness of the experimental unit.

Data Injection: Inject/transform data and/or store in specified backend. This task is optional.

Serve Explanations: initialize the A/B Server and serve explanations and/or collect feedback.

Different tasks may be combined to support the execution of one or more different workflows. Tasks may be dependent on each other, e.g., a "Data Injection" task is run after the "Perform Assignments" task. The Experiment Orchestrator can group different tasks into one or more conceptually different workflows, which may either run independently or sequentially.

In various embodiments, the Experiment Orchestrator is configuration-based. After reading the configurations, it creates a set of metadata loaders responsible for parsing the configurations and creating the associated metadata to conduct the experiment. In this process, each loader is responsible for applying any specific processing that is required. For example, a dataset loader is configured to load a dataset, imputation, and encoding it to a specified format. A feature loader is configured to read the features and verify their existence and compliance with each model. Similar to tasks, different loaders may have dependencies. In various embodiments, certain metadata (e.g., last metadata) to be generated corresponds to the explainers and the models, which are dynamically loaded to execution time. To this end, the loaders read the class path defined for each of the explainers included in the configuration provided to the Experiment Orchestrator, and attempt to dynamically load them. A first task terminates after loading the base metadata and persisting it in the database 750.

The Experiment Orchestrator supports the bulk generation of explanations for different models and explainer implementations, given that the appropriate training and test sets are provided. In various embodiments, this task assumes that the explainers loaded in the previous task follow the implementation standards described with respect to the XAI engine 720. Then, the Experiment Orchestrator iterates over the models grid (e.g., grid of potential models for which to generate explanations). For each model, it applies any additional preprocessing that might be necessary, hence avoiding repeating the processing step for every possible combination of models and explainers. Larger datasets will especially benefit from this. After adjusting the dataset, the Experiment Orchestrator iterates the explainers grid, calling "explain all" for each explainer, finally, persisting the result in the database. After generating all the explanations and before terminating a second task, intermediate artifacts that are no longer required (such as the model objects) can be removed for efficiency purposes.

While the first two tasks aim to provide the mechanisms and the data to serve during a randomized experiment, the remaining tasks aim to perform setup in terms of the systems to be able to run a proper randomized experiment. In particular, the following two tasks concern data transformations which may be necessary to overcome potential limitations when integrating the system in an environment with stringent data requirements. Beginning with task 3, the Experiment Orchestrator reads the provided configurations about the users intended to run the experiment and performs a few validations, including their integrity in the original system and the viability of using them for the purpose of the experiment. If successful, the Experiment Orchestrator creates metadata with the information about the users and persists it in the metadata database. The next step is to load the test set, e.g., the dataset whose content is to be used for the randomized experiment. The information about the users and the dataset are then provided to an ID Generator associated with A/B Engine 740 to create the final sample to use in the course of the experiment. The resulting dataset may be larger in size, depending on the value specified for the overlapping configuration, which states whether or not to generate a sample with a portion of the experimental units to be used for inter-annotator agreement. The metadata associated with the final sample is also persisted into the metadata database and can be later used for running the statistical tests.

In task 4, the Experiment Orchestrator leverages the Data Injection component to apply transformations to the data and, if necessary, inject them in the specified backends. To this end, the Experiment Orchestrator dynamically loads the necessary Injectors and applies them to the specified sets. Additionally, to support systems whose temporal component may serve as context for some downstream task, the proposed system optionally supports insertion of historical data into a "contextual dataset", which is a set that serves as historical information to the user. Moreover, it is expectable that the transformations applied to contextual information are not exactly the same as the ones applied to the set being served during the experiment.

In order to enhance reproducibility and to be able to recover the state of a given experiment in the case of unexpected failure, the Experiment Orchestrator can create metadata representing the different injections and the parameters used to produce them and persist them in the database.

Finally, task 5 is concerned with the A/B server setup. To this end, the Experiment Orchestrator loads the server side configurations, and communicates with the A/B server module to initialize the controllers and expose the necessary endpoints. From this point on, the execution flow remains on the server side, which continuously collects and serves the randomized experiment.

In various embodiments, tasks 1, 2, and 5 are performed for running a randomized experiment, and may be executed in different runs of the Experiment. The other tasks are optional. The communication between the different tasks can be performed asynchronously through a database of metadata, where the different details about an experiment are being kept for both reproducibility and accountability purposes. However, in various embodiments, it is still necessary that the dependencies among tasks are guaranteed, which implies running the tasks in order, even if in different runs.

Figure 9:
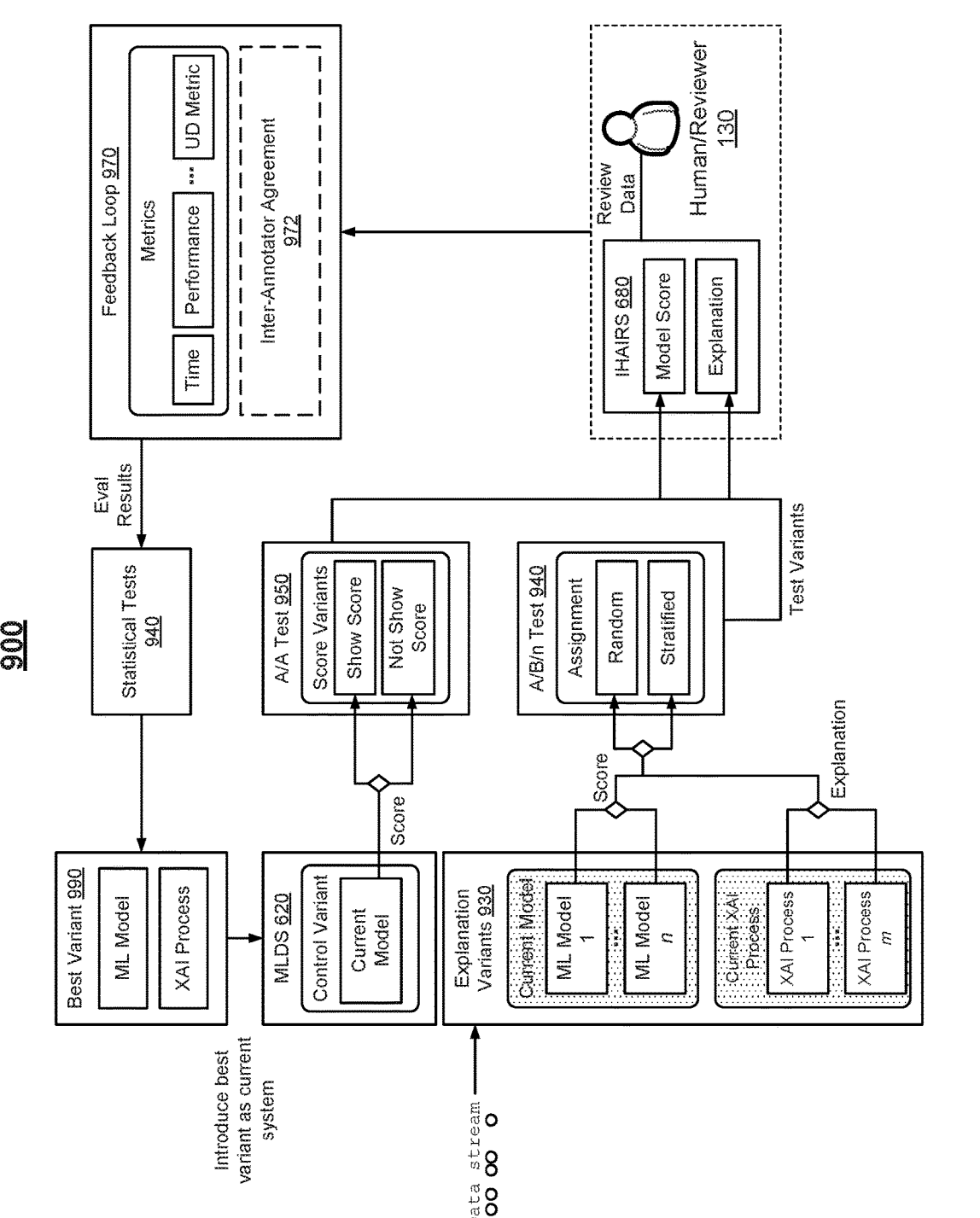
FIG. 9 is a conceptual diagram of a workflow associated with a system for human-in-the-loop evaluation for explainable artificial intelligence according to embodiments of the present disclosure.

FIG. 9 is a conceptual diagram of a workflow associated with a system for human-in-the-loop evaluation for explainable artificial intelligence according to embodiments of the present disclosure. The system includes machine learning decision system (MLDS) 620, interface human-AI review system (IHAIRS) 680, and an XAI evaluation system that includes the other components shown in FIG. 9. Each of the components are like their counterparts in FIGS. 6-8 unless otherwise described herein.

The workflow starts by receiving instances from a stream for a human (sometimes simply called a "reviewer") 130 to review. In various embodiments, the data stream goes through the MLDS, produces a score, and that score is shown to the reviewer through an IHAIRS. The decision of the reviewer 130 is recorded and can be used to update the MLDS via feedback loop 970 as further described herein.

In various embodiments, the MLDS has a set of models and associated XAI processes/implementations, each creating its own variant. A selected variant is the most appropriate variant 990 with an ML Model and associated XAI process/ implementation.

In various embodiments, there is a division between the A/A and A/B/n tests. For example, the A/A test has access to the original MLDS, and will have an option to experiment on the effect of showing the current model in production score of the instance being reviewed by the reviewer. The A/B/n test has access to all the models and XAI implementations (930) to test, including the model used in control with no explanations. In some embodiments, explanations for the same model that are evaluated in the control are also tested (e.g., allowing informed decisions and a valid way of comparison). In some embodiments, for each instance that is received by system 900, the system determines if an A/A Test 950 or an A/B/n Test 940 is running using a defined stop criteria (e.g., either the inter-annotator agreement and the stationarity test reach an acceptable value, or the review set is depleted, etc.), assigns the instance to one or more reviewers (using an assignment process such as the one described in FIG. 5) and assigns the ML model, whether to show a score, and an XAI implementation. For example, an instance may be assigned to all reviewers for tests, which is the case for instances in the agreement set. Unlike conventional systems that typically only record the decision of the reviewer, system 300 records various metrics for each instance, (e.g., time to decide, questionnaire answers), which corresponds to the explicit and implicit feedback from the reviewer.

These metrics correspond to the OECs. In the case of being part of the agreement set, additional information about the inter-annotator agreement 972 is also recorded.

A module of statistical tests 940 (examples of which are described with respect to 304) is included to evaluate one or more conditions such as: i) the metrics associated to the decision process of the reviewer are stable, and not changing over time (which is a stopping criteria for the A/A test, along with a minimum value for the Inter-Annotator Agreement metric in various embodiments); ii) the reviewers are statistically different from each other on the gathered metrics (which is the determinant factor for the choice of assignment strategy in various embodiments); iii) the variants (including the control variant) are statistically different from each other (which is the main objective of the experiment in various embodiments). In various embodiments, these statistical tests are applied to the gathered metrics during the A/A Test (for condition i), at the end of the A/A Test (for condition ii) and at the end of the A/B/n Test (for condition iii). With the results from the test for condition iii), an additional round of paired tests may be performed in case of a positive result, to determine which variants are statistically better than the control variant in the gathered metrics. In effect, the most appropriate XAI implementation for a given application is selected. In some embodiments, with this sub-group of ML models and XAI implementations, the calculation of compound effect size is determined, and the variant with the better effect size is chosen as the new MLDS.

Additional extensions to the described process include strategies of early stopping, which provide an option to end without gathering all samples. Such strategies include the family of SPRT tests, Sequential Generalized Likelihood Ratio Tests, and Bayesian A/B Testing. The design of such experiments is called sequential sampling, where the null hypothesis is tested at each new sample, and there is an additional possible outcome for the statistical tests employed, which is inconclusive, i.e., no hypothesis can be accepted/rejected.

Also, the process can be extended by using a Multi-Armed Bandit approach, and giving information about the instance and user. For example, a contextual Bandit approach can be used to optimize the explanation to be served to a given type of instance and user. These processes differ from a randomized control trial approach due to the exploitation step, which enforces the usage of the optimal calculated variant for the given information. The distributions for each combination of explanation/instance/user types are estimated during an exploration step, similar to a randomized control trial.

Figure 10:
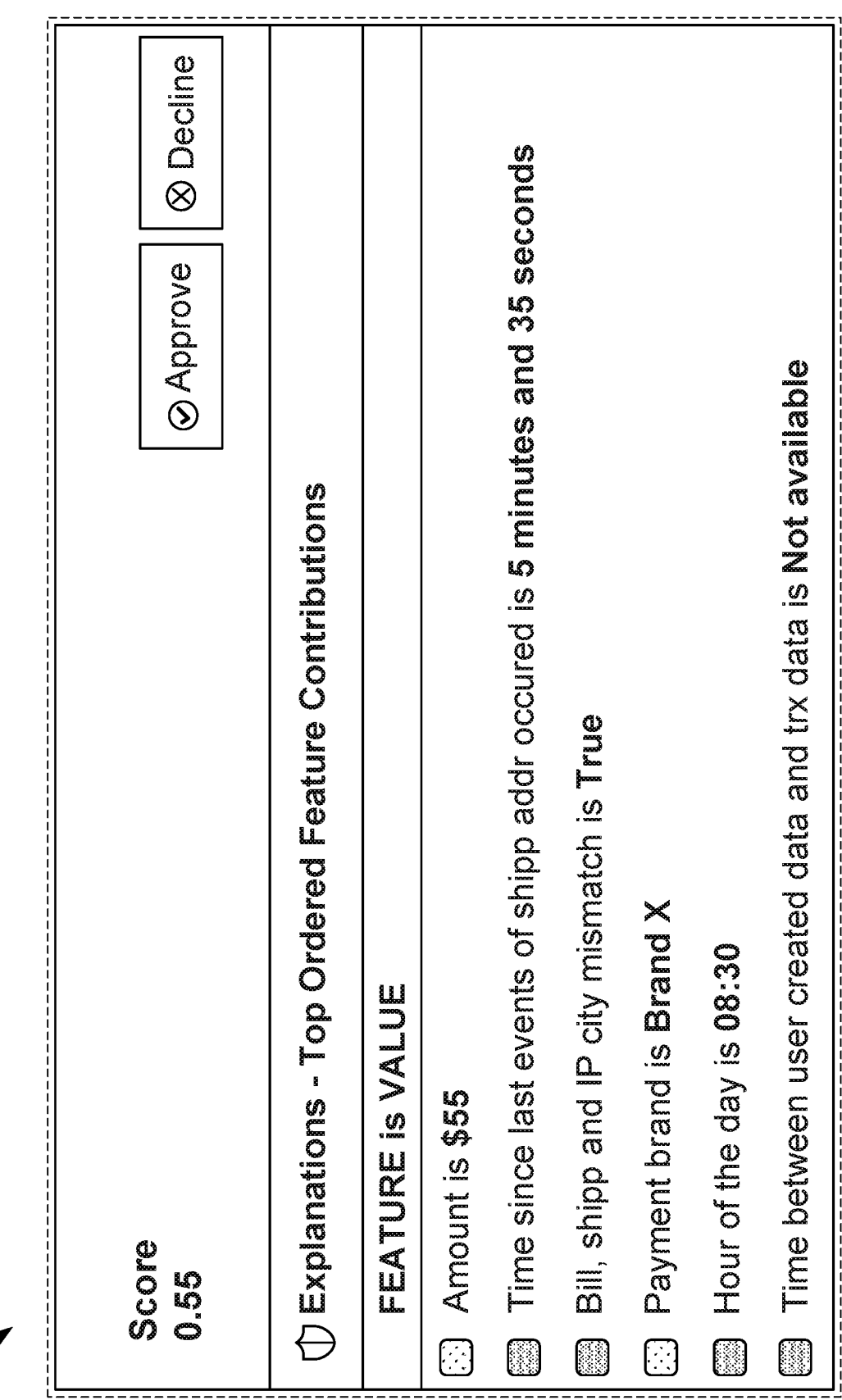
FIG. 10 shows an example of a graphical user interface obtained in some embodiments.

FIG. 10 shows an example of a graphical user interface obtained in some embodiments. This is an example of an interface human-AI review system such as 680 of FIGS. 6, 8, and 9. The graphical user interface (GUI) 1000 can be displayed to a reviewer/tester (e.g., fraud analyst) during the experiments. In this example, the GUI presents a score, which is the ML model score/decision about a current transaction. The score can be a value on any scale. In this example, the score is a number between 0 and 1, with larger values indicating that the transaction is more likely to be fraud.

The fraud analyst can approve or decline the transaction, with approval meaning the transaction is allowed to proceed since it is not likely fraud and declining meaning the transaction is not allowed to proceed because it is likely fraud.

The GUI also presents explanations for how the model score was obtained. In this example, there are six pairs of feature-contributions ordered based on contribution value to the model score being 0.55. Any number (other than six) of feature-contributions can be displayed, depending on screen size or user preference for example. Unlike other tabular explanation formats, such as decision lists and decision sets, the feature-contribution format in this example is advantageous for its readability, simplicity, and visualization flexibility.

For example, the feature-contributions homogenize the explanation representation across explainers. Given a set of feature-contribution pairs, the pairs are sorted in descending order by absolute contribution value, and transformed into a human-readable format. This transformation includes mapping the feature name to a natural language description plus parsing the feature value (e.g., converting time from seconds to days).

In this example, the GUI is also able to present a color-based visual cue to reflect the changes in the associated suspicious risk (score): negative contributions represented with green (or lighter shading), as they contribute for lower scores and consequently legitimate transactions, and, conversely, positive contributions represented with red (or darker shading).

Variants can be presented in the GUI. For example, one user may see a first version of information while another user sees another version of the information. The version that gets selected to be presented to a particular user may be based on the assignment process disclosed herein (e.g., FIG. 5).

The disclosed techniques for human-in-the-loop evaluation for explainable artificial intelligence have many advantages over conventional techniques. Conventional techniques typically only provide ad hoc explanations and do not have a methodology for evaluating the impact of showing explanations to a human-in-the-loop. Because conventional techniques typically use case-based tests on validation to determine if an explanation is aligned with what a model predicts or common knowledge, they typically do not show the impact on an application. By contrast, in various embodiments, the disclosed techniques provide post-hoc explanations, so models are compared and can be more helpful for the human in the loop making a decision. Various other embodiments provide in-model explanations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving a data stream;

analyzing data elements of the data stream using one or more machine learning models and one or more machine learning prediction explanation implementations;

testing different candidate presentations associated with machine learning results provided to different reviewers in a group of human-in-the-loop reviewers that review predictions of the one or more machine learning models, wherein the different candidate presentations include different explanations generated by the one or more machine learning prediction explanation implementations and at least one control candidate presentation corresponding to an absent explanation;

monitoring, by a computing system, different aspects of the testing including determining a stationarity metric indicative of a stability of user interaction metrics of the reviewers over time, and monitoring the user interaction metrics associated with graphical user interface interactions of the reviewers with the different candidate presentations, the user interaction metrics, wherein a first candidate presentation of the different candidate presentations comprises displaying, within the graphical user interface, a sorted list of a plurality of feature-contribution pairs for a data element, wherein the list is sorted in descending order based on a contribution value of each pair, and wherein each feature-contribution pair is visually distinguished by a color-based cue indicating a polarity of its contribution value, the polarity indicating whether the contribution increases or decreases a risk score associated with the data element; and using one or more processors to analyze results of the monitoring collected after the stationarity metric satisfies a threshold criterion to determine statistically significant differences in the interaction metrics between the different candidate presentations and to make a selection among the different candidate presentations based on the determined statistically significant differences to optimize the one or more machine learning prediction explanation implementations.

2. The method of claim 1, wherein the analysis of the data elements of the data stream is associated with detecting fraudulent transactions.

3. The method of claim 1, wherein the at least one control candidate presentation corresponds to A/A testing.

4. The method of claim 1, wherein one or more of the different candidate presentations including the different explanations generated by the one or more machine learning prediction explanation implementations correspond to A/B/n testing.

5. The method of claim 1, wherein testing the different candidate presentations includes:

measuring defined objective metrics in a control environment;

determining that one or more stopping criterion is met;

in response to the determination that the one or more stopping criterion is met, performing one or more statistical tests;

estimating an underlying distribution for each metric of the defined objective metrics;

determining usefulness of explanations; and estimating an effect size for the different candidate presentations.

6. The method of claim 5, wherein the one or more stopping criterion includes at least one of: inter-annotator agreement and stationarity reaching a threshold value, or a review set being depleted.

7. The method of claim 5, wherein the performance of the one or more statistical tests includes performing a one-factor test.

8. The method of claim 5, wherein the performance of the one or more statistical tests includes performing a two-factor test by comparing differences between unique combinations of all groups to determine whether there is one or more variants that deviate from control by more than a threshold amount.

9. The method of claim 5, wherein the performance of the one or more statistical tests includes performing a two-factor test in response to a determination that a mean value of at least one of the defined objective metrics is different between two or more groups.

10. The method of claim 5, wherein the performance of the one or more statistical tests includes performing a stability test to determine that underlying distributions have converged.

11. The method of claim 5, wherein the selection from among the different candidate presentations corresponds to a candidate presentation with the most positive composite effect size among the different candidate presentations.

12. The method of claim 1, wherein the monitoring of the different aspects of the testing includes:

determining whether user behavior relative to overall evaluation criteria is different from one another;

determining whether there is a statistically significant difference between the different candidate presentations; and determining stationarity of measurements for each user.

13. The method of claim 12, wherein the determination of whether there is a statistically significant difference between the different candidate presentations includes determining that groups are different based at least in part on detecting a result associated with the overall evaluation criteria that meets a criterion.

14. The method of claim 1, wherein using the results of the monitoring to make the selection among the different candidate presentations includes:

determining that there is a difference between users that meets a criterion; and in response to the determination that there is a difference between users that meets the criterion, applying a stratified assignment such that each user receives a balanced quantity of instances for a given attribute or class, as well as a balanced quantity of instances for each group of an experiment.

15. The method of claim 1, wherein using the results of the monitoring to make the selection among the different candidate presentations includes:

determining that there is not a difference between users that meets a criterion; and in response to the determination that there is not a difference between users that meets the criterion, applying a random assignment.

16. The method of claim 1, wherein the one or more machine learning prediction explanation implementations are utilized to generate the different explanations for at least one of the data elements including at least one of: (i) explaining a specific one of the data elements or (ii) explaining all of the data elements by iteratively creating explanations for a set of the data elements.

17. The method of claim 1, wherein the one or more machine learning prediction explanation implementations are utilized to generate the different explanations including by normalizing a format of the different explanations.

18. The method of claim 1, wherein the test of the different candidate presentations includes:

generating randomized experiment metadata;

generating explanations and variants;

performing assignments;

transforming data associated with the different candidate presentations to a normalized format; and serving the different explanations associated with the one or more machine learning prediction explanation implementations.

19. A system, comprising:

a processor configured to:

receive a data stream;

analyze data elements of the data stream using one or more machine learning models and one or more machine learning prediction explanation implementations;

test different candidate presentations associated with machine learning results provided to different reviewers in a group of human-in-the-loop reviewers that review predictions of the one or more machine learning models, wherein the different candidate presentations include different explanations generated by the one or more machine learning prediction explanation implementations and at least one control candidate presentation corresponding to an absent explanation;

monitor different aspects of the testing including by being configured to determine a stationarity metric indicative of a stability of user interaction metrics of the reviewers over time, and monitor the user interaction metrics associated with graphical user interface interactions of the reviewers with the different candidate presentations, the user interaction metrics, wherein a first candidate presentation of the different candidate presentations comprises displaying, within the graphical user interface, a sorted list of a plurality of feature-contribution pairs for a data element, wherein the list is sorted in descending order based on a contribution value of each pair, and wherein each feature-contribution pair is visually distinguished by a color-based cue indicating a polarity of its contribution value, the polarity indicating whether the contribution increases or decreases a risk score associated with the data element; and analyze results of the monitoring collected after the stationarity metric satisfies a threshold criterion to determine statistically significant differences in the interaction metrics between the different candidate presentations and to make a selection among the different candidate presentations based on the determined statistically significant differences to optimize the one or more machine learning prediction explanation implementations; and a memory coupled to the processor and configured to provide the processor with instructions.

20. A computer program product embodied in a non-transitory computer readable medium and comprising computer instructions for:

receiving a data stream;

analyzing data elements of the data stream using one or more machine learning models and one or more machine learning prediction explanation implementations;

testing different candidate presentations associated with machine learning results provided to different reviewers in a group of human-in-the-loop reviewers that review predictions of the one or more machine learning models, wherein the different candidate presentations include different explanations generated by the one or more machine learning prediction explanation implementations and at least one control candidate presentation corresponding to an absent explanation;

monitoring, by a computing system, different aspects of the testing including determining a stationarity metric indicative of a stability of user interaction metrics of the reviewers over time, and monitoring the user interaction metrics associated with graphical user interface interactions of the reviewers with the different candidate presentations, the user interaction metrics, wherein a first candidate presentation of the different candidate presentations comprises displaying, within the graphical user interface, a sorted list of a plurality of feature-contribution pairs for a data element, wherein the list is sorted in descending order based on a contribution value of each pair, and wherein each feature-contribution pair is visually distinguished by a color-based cue indicating a polarity of its contribution value, the polarity indicating whether the contribution increases or decreases a risk score associated with the data element; and analyzing results of the monitoring collected after the stationarity metric satisfies a threshold criterion to determine statistically significant differences in the interaction metrics between the different candidate presentations and to make a selection among the different candidate presentations based on the determined statistically significant differences to optimize the one or more machine learning prediction explanation implementations.

* * * * *